US005682955A

United States Patent [19]
Groth et al.

[11] Patent Number: 5,682,955
[45] Date of Patent: Nov. 4, 1997

[54] BLADE CONTROL SYSTEM FOR AN EARTHMOVING BLADE

[75] Inventors: Steven L. Groth, Morton, Ill.; Richard A. Arstein, Sahuarita, Ariz.; Randall A. Harlow, Brimfield, Ill.; David P. Smith, Joliet, Ill.; Richard J. Skiba, Peoria, Ill.

[73] Assignee: Caterpillar Inc., Peoria, Ill.

[21] Appl. No.: 707,830

[22] Filed: Sep. 6, 1996

[51] Int. Cl.$^6$ .................................. C02F 3/76; E02F 3/85

[52] U.S. Cl. .............................. 172/811; 172/804; 91/413

[58] Field of Search .............................. 91/411, 413, 436, 91/526, 529, 531; 60/39.04, 39.25, 39.281, 39.03; 172/801–809, 804, 811, 812, 826, 4, 4.5, 7

[56] References Cited

U.S. PATENT DOCUMENTS

| | | | |
|---|---|---|---|
| 3,654,835 | 4/1972 | Sievenpiper | 91/436 |
| 3,705,631 | 12/1972 | Seaberg | 172/804 |
| 4,397,221 | 8/1983 | Friesen et al. | 91/420 |
| 4,635,532 | 1/1987 | Tanino et al. | 91/436 |
| 4,802,537 | 2/1989 | Ryerson | 172/812 |
| 5,062,349 | 11/1991 | Khan | 91/436 |
| 5,251,705 | 10/1993 | Waggoner et al. | 172/812 |
| 5,370,038 | 12/1994 | Poppe et al. | 91/436 |

*Primary Examiner*—Terry Lee Melius
*Assistant Examiner*—Robert Pezzuto
*Attorney, Agent, or Firm*—John W. Grant

[57] ABSTRACT

A blade control system includes a directional control valve, a fluid regeneration valve and a selector valve for selectively controlling fluid flow between a pump and first and second hydraulic cylinders and between the cylinders. With the valves positioned at preselected operative positions, pressurized fluid from the pump is directed to the head end chamber of the first cylinder, fluid expelled from the rod end chamber of the first cylinder is diverted to the head end chamber of the second cylinder, and fluid expelled from the rod end chamber of the second cylinder is combined with the fluid being directed to the head end chamber of the first cylinders to provide two stages of fluid regeneration for increasing the extension speed of the cylinder.

5 Claims, 1 Drawing Sheet

BLADE CONTROL SYSTEM FOR AN EARTHMOVING BLADE

TECHNICAL FIELD

This invention relates generally to a blade control system having a pair of master/slave cylinders which provide a first stage fluid flow regeneration and more specifically to a system having a second stage of fluid flow regeneration.

BACKGROUND ART

The use of a pair of hydraulic cylinders in a master/slave series flow relationship to achieve faster actuating speed of the hydraulic cylinders is well known. Typically, the rod end chamber of the master cylinder is connected to the head end chamber of the slave cylinder so that fluid discharged from the rod end chamber of the master cylinder is directed to the head end chamber of the slave cylinder when pressurized fluid is directed to the head end chamber of the master cylinder. The fluid exhausted from the rod end chamber of the slave cylinder is typically directed to the tank. Heretofore, the cylinders in a master/slave relationship have been identical in size and construction. One example of a system including the master/slave feature is disclosed in U.S. Pat. No. 4,802,537.

With the control system disclosed in the above-noted patent, the volume of fluid discharged from the rod end chamber of the master cylinder for each increment of movement of the piston rod is less than the volume of pressurized fluid directed to the head end chamber of the master cylinder. This results in the master cylinder extending a greater distance and faster than the slave cylinder. However, the blade of the '537 patent controlled by the pair of master/slave hydraulic cylinders is basically used for dozing operations and does not require very large fore and aft tipping motion. Thus, the stroke of the cylinders is relatively short and the disparity in the extension of the cylinders does not unduly affect the operation of the earthmoving blade.

The above reference to unequal extension rates of the hydraulic cylinders is a problem when the pair of master/slave hydraulic cylinders are connected to a "carry dozer" blade requiring much larger tipping motions of the blade to dump the material from the blade. More specifically, a significant amount of material remains on the side of the blade controlled by the slave cylinder when the master cylinder reaches its limit of,extension. Finally, the carry dozer is typically used in mass excavating types of operation and it would be desirable to dump the load faster than that obtained solely by the master/slave arrangement without drastically increasing the size of the supply pump. Moreover, it would be desirable to increase the extension speed of the slave cylinder to match the extension speed of the master cylinder so that both sides of the blade reach their maximum dumping position at the same time.

The present invention is directed to overcoming one or more of the problems as set forth above.

DISCLOSURE OF THE INVENTION

In one aspect of the present invention, a blade control system includes a pump connected to a tank, and first and second hydraulic cylinders disposed on opposite sides of a machine and between the machine and an earthworking blade. A directional control valve is connected to the pump and the tank and has first and second control ports. The directional control valve has an operative position communicating the pump with the first control port. A fluid regeneration valve is connected to the first and second control ports of the directional control valve and has a cylinder port and a valve port with the cylinder port being connected to the head end of the first cylinder. The fluid regeneration valve has an operative position at which the first control port of the directional control valve communicates with both the cylinder and valve ports. A selector valve is connected to the valve port of the fluid regeneration valve and has a second cylinder port connected to the rod end of the first cylinder, a third cylinder port connected to the rod end of the second cylinder and a fourth cylinder port connected to the head end of the second cylinder. The selector valve has an operative position communicating the rod end of the first cylinder with the head end of the second cylinder and the rod end of the second cylinder with the valve port of the fluid regeneration valve.

DETAILED DESCRIPTION OF THE PREFERRED EMBODIMENT

Figure 1:
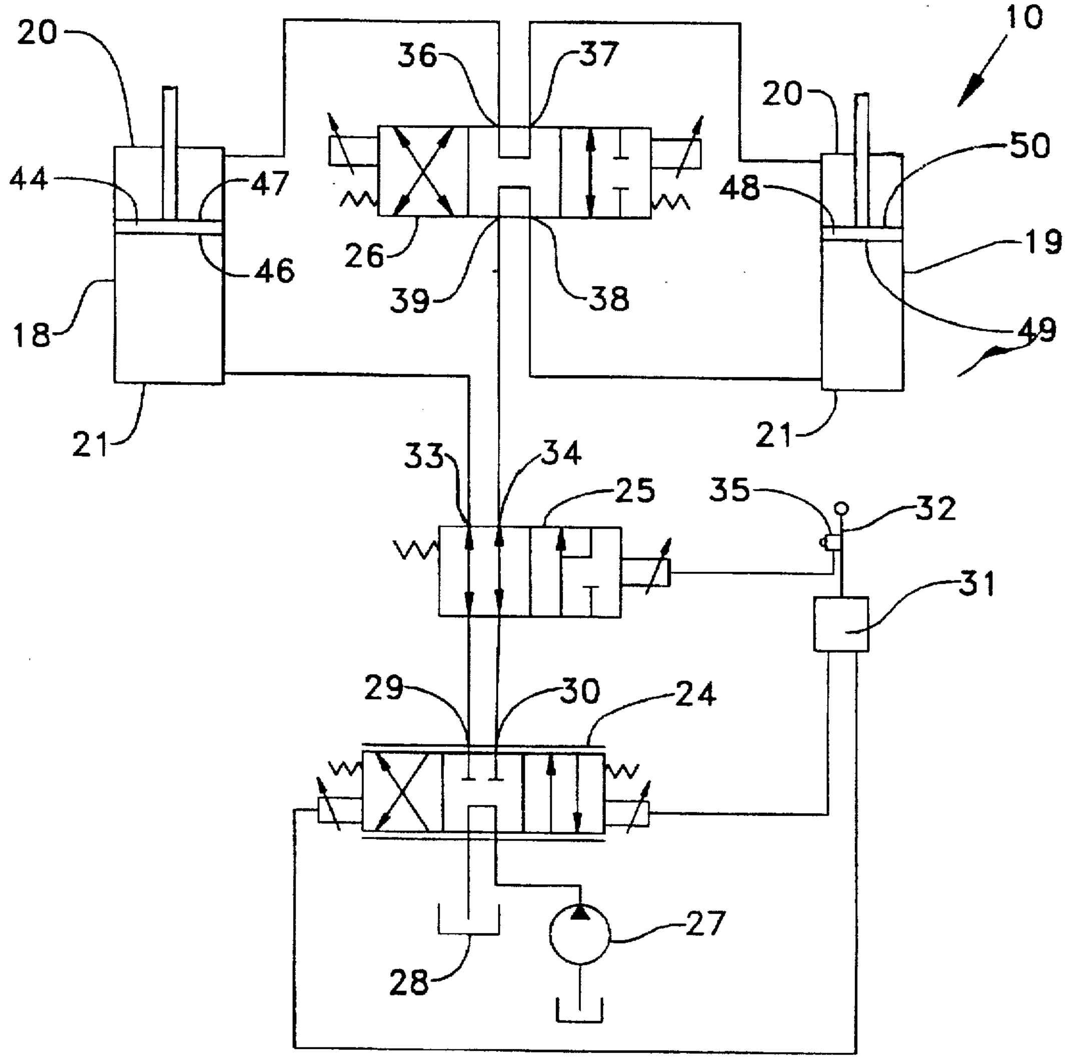
FIG. 1 is a schematic illustration of an embodiment of the present invention.
Figure 2:
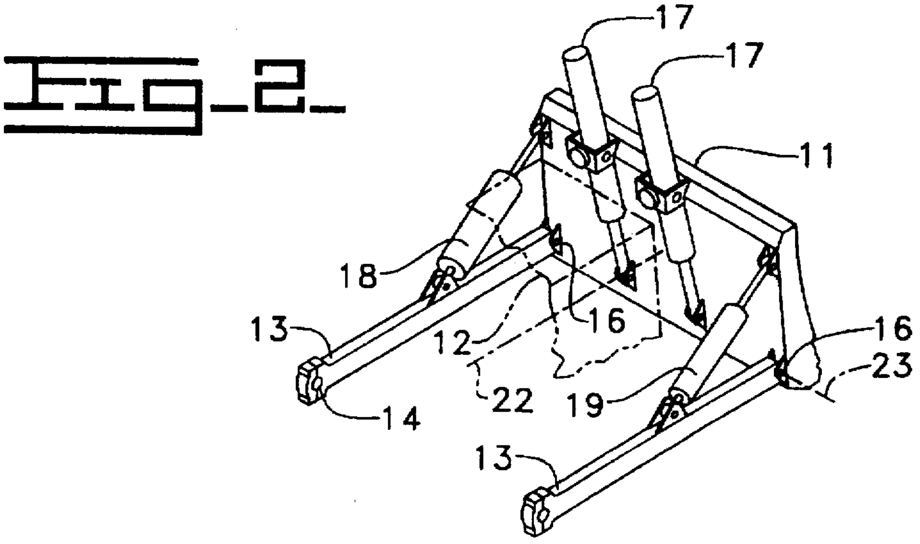
FIG. 2 is an elevational perspective view of a representative blade which is variably positioned by the blade control system of the present invention and further illustrating in fragmentary phantom outline a representative machine on which the blade is pivotally mounted.

Referring to the drawings, a blade control system 10 is illustrated for positioning an earthworking blade 11 suitably mounted on a machine 12. The machine includes a pair of push arms 13 mounted on opposite sides of the machine 12 through a pair of universal connections 14. The blade is pivotally connected to the forward ends of the push arms 13 by a pair of universal connections 16. A pair of double acting hydraulic lift cylinders 17 are coupled intermediate the machine and the blade for raising and lowering the blade in the usual manner. A pair of double acting hydraulic tilt/tip cylinders 18,19 are disposed on opposite sides of the machine between the push arms 13 and the blade 11 for tilting and tipping the blade relative to the machine. Each of the tilt/tip cylinders 18,19 have a rod end chamber 20 and a head end chamber 21.

It should hereinafter be appreciated that in this application, tilting is the action of moving the blade 11 about a horizontally arranged longitudinal axis 22 substantially perpendicular to the blade, whereas tipping is the action of moving the blade about a horizontally arranged transverse axis 23 substantially parallel to the blade.

The blade control system 10 includes a solenoid operated directional control valve 24, a solenoid operated fluid regeneration valve 25, and a solenoid operated selector valve 26 that are conventionally actuated by electric signals. The directional control valve 24 is connected to a pump 27 and a tank 28 and has a pair of control ports 29,30. The directional control valve is shown in a neutral position and is movable in opposite directions to first and second variable operative positions. The directional control valve is this embodiment is actuated, for example, by electric signals received from a signal generator 31 in response to appropriate movement of a lever 32.

The fluid regeneration valve 25 is a two-position valve and is connected to the control ports 29,30 of the directional control valve. The fluid regeneration valve 25 has a cylinder port 33 and a valve port 34 with the cylinder port 33 being connected to the head end chamber 21 of the left cylinder 18. The regeneration valve 25 is normally biased to an operative position shown and is movable leftward to another operative position. In this embodiment, the fluid regeneration valve is moved leftward in response to receiving an electric signal, for example, from a push button 35 mounted on the control lever 32.

The selector valve 26 is connected to the valve port 34 of the regeneration valve 25 and has a cylinder port 36 connected to the rod end chamber 20 of the hydraulic cylinder 18, and another pair of cylinder ports 37,38 connected to the rod end and head end chambers 20,21 respectively of the hydraulic cylinder 19. The selector valve is a three position valve and is spring biased to the position shown. The selector valve is movable in a opposite directions from the position shown to two operative positions. The selector valve 26 can be shifted in any conventional manner independently of or in combination with movement of the lever 32.

The hydraulic cylinder 18 includes a piston 44 separating the head end and rod end chambers 21,20 with the piston having a circular area 46 defining one end of the head end chamber and an annular area 47 defining one end of the rod end chamber 20. Similarly, the hydraulic cylinder 19 has a piston 48 separating the head and rod end chambers with the piston having a circular area 49 defining one end of the head end chamber 21 and a circular area 50 defining one end of the rod end chamber 20. In this embodiment, the annular area 47 of the piston 44 is equal to the circular area 49 of the piston 48 and the circular area 46 of the piston 44 is larger than the circular area 49 of the piston 48.

In this embodiment, the directional control valve 24, regeneration valve 25 and selector valve 26 are described as solenoid operated valves actuated by electric signals. However, the invention is not limited to this specific form of the valves and each of them may be formed as a pilot operated valve actuated by a pilot signal generated by a proportional valve which is actuated by an electrical signal or a manually controlled pilot valve.

Industrial Applicability

In use with the selector valve 26 moved to its rightward operative position, the operator can obtain two stage regeneration for rapid extension of the hydraulic cylinders 18,19 to tilt the blade 11 forwardly by depressing the push button 35 to actuate the fluid regeneration valve 25 to its leftward operative position while moving the control lever 32 rightward, for example, to actuate the directional control valve 24 to its rightward operative position. With the valves 24,25,26 in the above noted position, pressurized fluid from the pump 27 is directed to the head end chamber 21 of the hydraulic cylinder 18. The hydraulic cylinder 18 functions as a master cylinder with the fluid expelled from the rod end chamber 20 being directed through the selector valve to the head end chamber 21 of the hydraulic cylinder 19 which functions as a slave cylinder. This provides the first stage of fluid regeneration the cylinders are extended at a rate about 2–3 times faster than if the pump flow was divided between the head end chambers of both cylinders. In this embodiment, since the annular area 47 of the piston 44 is equal to the circular end 49 of the piston 48, both cylinders will extend at identical speeds.

The second stage fluid regeneration is established by combining the fluid expelled from the rod end chamber 20 of the hydraulic cylinder 19 with the fluid passing through the regeneration valve 25 from the pump 27 to the head end chamber 21 of the hydraulic cylinder 18. Combining the fluid expelled from the rod end chamber 20 with the fluid directed to the head end chamber 21 of the hydraulic cylinder 18 causes the extension speed of the hydraulic cylinders to be increased by another 2–3 times resulting in a cylinder being extended at a rate of about 4–6 times faster than if the pump flow was divided between the head end chambers of both cylinders.

A slower, forward tipping mode is established by leaving the regeneration valve 25 in the position shown, moving the selector valve 26 rightward to its operative position and moving the directional control valve 24 rightward to communicate pressurized fluid from the pump 27 to the head end chamber 21 of the hydraulic cylinder 18. The fluid expelled from the rod end chamber 20 passes through the selector valve 26 to the head end chamber 21 of the hydraulic cylinder 19. However, in this mode, the fluid exhausted from the rod end chamber 20 of the hydraulic cylinder 19 is returned to the tank so that the second stage fluid regeneration feature is negated.

Rearward tipping of the blade is accomplished by moving the directional control valve 24 leftward while the selector valve 26 is in its rightward position and the regeneration valve is in the position shown. With the valves in these positions pressurized fluid from the pump passes through the directional control valve, the fluid regeneration valve 25 and through the selector valve 26 to the rod end chamber 20 of the hydraulic cylinder 19. Fluid expelled from the head end chamber 21 of the hydraulic cylinder 19 passes through the selector valve to the rod end chamber 20 of the hydraulic cylinder 18. The fluid expelled from the head end chamber 21 of the hydraulic cylinder 18 is vented to the tank 28. With the circular area 49 of the piston 48 being equal to the annular area 47 of the piston 44, both cylinders will retract at the same speed.

Dual cylinder tilting of the blade is accomplished by actuating the directional control valve 24 with the fluid regeneration valve 25 and the selector valve 26 in the positions shown. Single cylinder tilting of the blade is accomplished by actuating the directional control valve 24 with the regeneration valve 25 in the position shown and the selector valve 26 shifted to its leftward operative position.

Other aspects, objects and advantages of this invention can be obtained from a study of the drawings, the disclosure and the appended claims.

We claim:

1. A blade control system for an earthmoving blade pivotally mounted on a machine so that the blade can be tipped fore and aft comprising:

a tank;

a pump;

first and second hydraulic cylinders each having a head end chamber and a rod end chamber, the cylinders being disposed on opposite sides of the machine between the machine and the blade;

a directional control valve connected to the pump and the tank and having first and second control ports, the directional control valve having an operative position communicating the pump with the first control port;

a fluid regeneration valve connected to the first and second control ports of the directional control valve and having a cylinder port connected to the head end of the first cylinder and a valve port, the regeneration valve having an operative position at which the first control port of the directional control valve and the valve port communicate with the cylinder port; and a selector valve connected to the valve port of the regeneration valve and having a second cylinder port connected to the rod end chamber of the first cylinder, a third cylinder port connected to the rod end chamber of the second hydraulic cylinder, and a fourth cylinder port connected to the head end chamber of the second cylinder, the selector valve having an operative position communicating the rod end of the first hydraulic cylinder with the head end of the second hydraulic cylinder and the rod end of the second hydraulic cylinder with the valve port of the regeneration valve.

2. The blade control system of claim 1 wherein the second control port of the directional control valve communicates with the tank at said operative position of the directional control valve, and the fluid regeneration valve has another operative position at which the first control port of the directional control valve communicates with the first cylinder port of the regeneration valve and the second control port of the directional control valve communicates with the valve port of the regeneration valve.

3. The blade control system of claim 1 wherein each of the first and second hydraulic cylinders include a piston separating the head end chamber and the rod end chambers, the pistons having a circular area defining one end of the head end chambers and an annular area defining one end of the rod end chambers with the circular area of the piston of the first hydraulic cylinder being larger than the circular area of the second hydraulic cylinder.

4. A blade control system for an earth working blade pivotally mounted on a machine so that the blade can be tipped fore and aft comprising;

first and second hydraulic cylinders each including a head end chamber and a rod end chamber and a piston separating the head end and rod end chambers, each of the pistons having a circular area defining one end of the head end chamber of the associated hydraulic cylinder and an annular area defining one end of the rod end chamber of the associated hydraulic cylinder, the hydraulic cylinders being disposed on opposite sides of the machine and between the machine and the blade;

valve means operative for connecting the rod end chamber of the first hydraulic cylinder with the head end chamber of the second hydraulic cylinder in a series flow relationship so that fluid exhausted from the rod end chamber of the first hydraulic cylinder is directed to the head end chamber of the second hydraulic cylinder; and the circular area of the piston of the first hydraulic cylinder being larger than the circular area of the second hydraulic cylinder.

5. The blade control system of claim 4 wherein the annular area of the piston of the first cylinder is equal to the circular area of the piston of the second hydraulic cylinder.

* * * * *